W. H. BARLING.
AEROFOIL ARRANGEMENT FOR AIRCRAFT.
APPLICATION FILED FEB. 17, 1921.
1,405,890.
Patented Feb. 7, 1922.
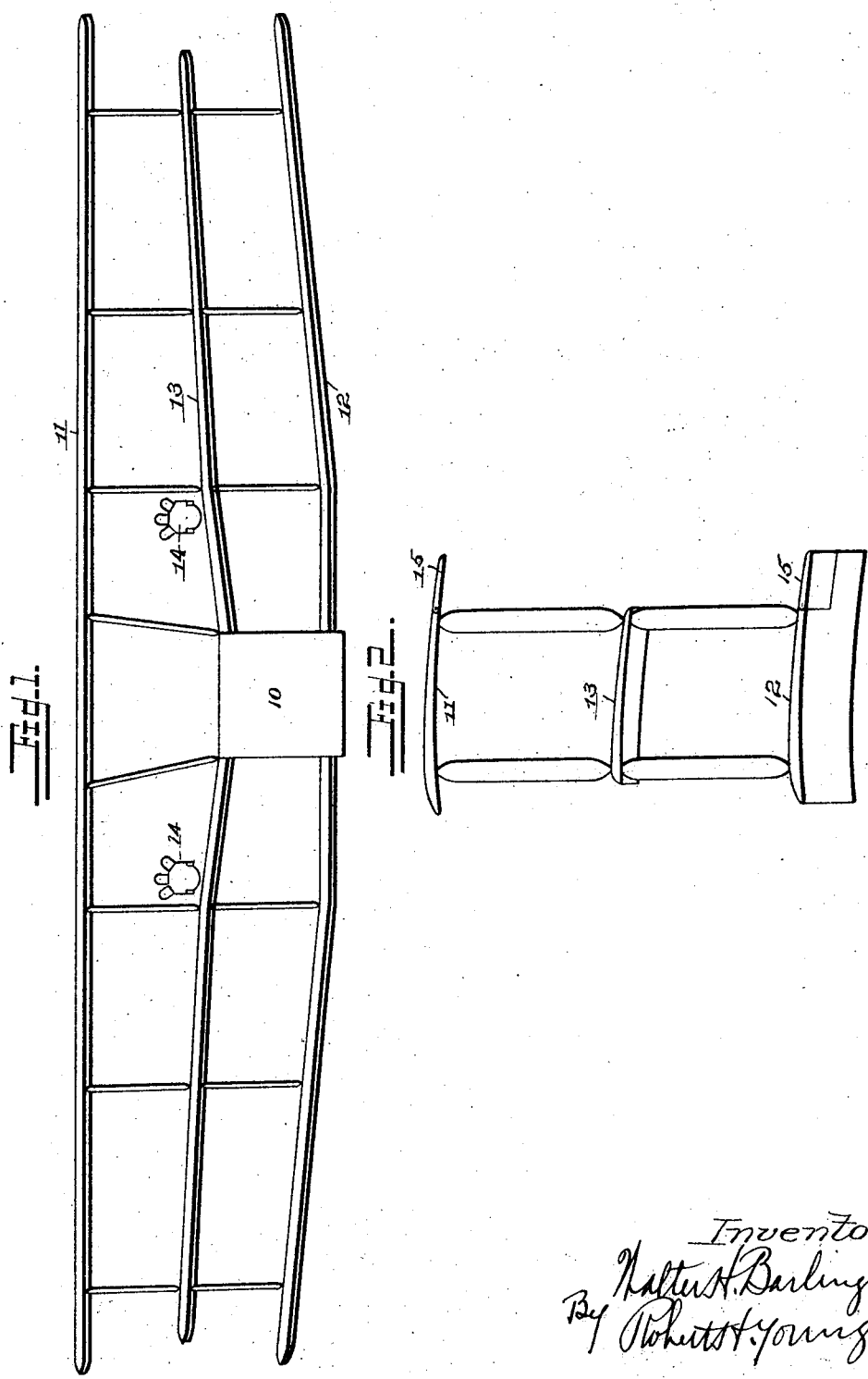

UNITED STATES PATENT OFFICE.

WALTER HENRY BARLING, OF HASBROUCK HEIGHTS, NEW JERSEY.

AEROFOIL ARRANGEMENT FOR AIRCRAFT.

1,405,890.  Specification of Letters Patent.  Patented Feb. 7, 1922.

Application filed February 17, 1921. Serial No. 445,845.

*To all whom it may concern:*

Be it known that I, WALTER H. BARLING, a subject of the King of Great Britain, residing at Hasbrouck Heights, in the county of Bergen and State of New Jersey, have invented certain new and useful Improvements in Aerofoil Arrangements for Aircraft, of which the following is a specification.

This invention relates to an aerofoil arrangement for aircraft and is particularly adapted to airplanes in which more than two superposed aerofoils or aerial supporting or controlling surfaces are employed. While the invention is particularly designed for use in conjunction with what are known as triplanes, multiplanes, or in other words, airplanes, having more than two supporting surfaces, it will be obvious that the principle herein shown and described may be adapted to other parts of an aircraft, such for example, as the vertical and horizontal rudders and the controlling surfaces of aerostats or dirigibles.

The main object of the invention is to increase the total supporting surfaces or controlling surface of an aircraft so as to impart greater lifting and carrying capacity thereto without impairing in any degree the stabilization of such craft by means of the usual stabilizing surfaces. This is also accomplished without increasing to any great extent the aerodynamic resistance of the craft and while retaining the structural advantages which are present in an aircraft of the multiplane type.

With the above and other objects in view the invention consists in the novel construction, combination and arrangement herein fully described, illustrated, and claimed.

In the accompanying drawings:

Fig. 1 is a partial front elevation of an airplane embodying the present invention;

Fig. 2 is a fragmentary side elevation thereof looking toward the outer tips or edges of the aerofoils or wings;

In the embodiment of the invention as illustrated in the drawings, 10 designates the fuselage or body of an airplane and 11 and 12 represent respectively the top and bottom aerofoils, planes or wings which may be of any desired length and of any desired chord and cambre.

In carrying out the present invention a relatively narrow intermediate aerofoil, plane or wing 13 is interposed between the aerofoils 11 and 12 and preferably about midway between the same so as to leave approximately equal gaps or spaces between said intermediate aerofoil and the top and bottom aerofoils 11 and 12. The intermediate aerofoil 13 is thus placed so as to form an excellent and convenient support for the power plant which is shown as consisting of a plurality of motors 14 arranged at opposite sides and equi-distantly from the vertical center of the fuselage 10.

The top and bottom aerofoils 11 and 12 are equipped with stabilizers 15 which are illustrated in the form of hinged ailerons the same being hinged to the trailing edges of the main and rigid sections of said top and bottom aerofoils. The ailerons or stabilizers 15 are used of course, for the purpose of effecting the lateral stabilization of the machine and any suitable controlling means may be employed for actuating said ailerons.

The intermediate aerofoil 13 is of much shorter chord than the top and bottom aerofoils, as clearly shown in Fig. 2, and is not equipped with any stabilizer such as an aileron. The chord of the intermediate aerofoil 13 is approximately equal to or somewhat less than the chords of the upper and lower aerofoils exclusive of the ailerons 15. Ordinarily the intermediate aerofoil will be so arranged with respect to distance from the top and bottom aerofoils that the gaps between the intermediate aerofoil and the upper and lower aerofoils will be approximately equal to or less than chord of the intermediate aerofoil. In this way any congestion of air currents passing between the several aerofoils will be eliminated, and the machine will fly with the ordinary amount of head resistance.

Under the ordinary arrangement of the aerofoils in a triplane or multiplane, the aerofoils are superposed but they are all of equal or approximately equal chord. This requires, for efficient lateral control, ailerons or stabilizers on all of the surfaces if they use equal or approximately equal span, since the innermost airplanes or aerofoils, if not so provided would interfere with the flow of air deflected by the ailerons or stabilizers against the other surfaces of the airplane. On the other hand, ailerons on the intermediate aerofoil or aerofoils are inherently inefficient. Hence in the ordinary arrangement, this complication is necessary but to a great extent—inefficient. The disadvantage just referred to is overcome by the arrangement herein shown and described, the chord of the intermediate aerofoil or aerofoils being approximately equal to or less than the chords of the top and bottom planes exclusive of the ailerons. Furthermore, if only one intermediate aerofoil is employed as shown in the drawings, the gap between the top and bottom aerofoils need not be much in excess of that necessary for a simple biplane formed by the top and bottom planes or aerofoils alone, this being due to the short chord of the intermediate aerofoil. Furthermore, the intermediate aerofoil provides a convenient and efficient support for the motive power of the aircraft although the motors may be otherwise supported if found desirable. While the aerofoils are shown superposed directly above each other with their leading edges normally in the same vertical plane, it will be obvious that the aerofoils may be staggered or given what is known in the art as an over-hang, that is to say, the leading edges of the planes may be arranged in a normally inclined plane with respect to each other to produce a forward stagger or over-hang, or a rearward overhang. Obviously, the omission of ailerons or stabilizers on the intermediate aerofoil effects a saving of weight without impairing the efficiency of the ailerons attached to the top and bottom aerofoils.

Structurally, the machine has all the advantages of a triplane or multiplane without requiring large gaps between the superposed aerofoils with the consequent increase in strut weight. An additional structural advantage resides in the adaptation of the intermediate aerofoils as an engine or motor support. Aerodynamically, the construction described has the advantage of reduction of resistance of the large struts of a triplane or multiplane of the usual design; also a reduction of the surface of the intermediate aerofoil or aerofoils which under the present arrangement are comparatively inefficient.

I claim:

1. In an aircraft, a lower aerofoil, an upper aerofoil in spaced relation thereto, stabilizers at the trailing edges of said aerofoils, and an intermediate aerofoil between said upper and lower aerofoils, said intermediate aerofoil having a chord substantially equal to the chords of the upper and lower aerofoils exclusive of the stabilizers, the lower and intermediate aerofoils being inclined at dihedral angles.

2. In an aircraft, a lower aerofoil, and upper aerofoil in spaced relation thereto, stabilizers at the trailing edges of said aerofoils, and an intermediate aerofoil between said upper and lower aerofoils, said intermediate aerofoil having a chord approximately equal to the chords of the upper and lower aerofoils exclusive of the stabilizers.

3. In an aircraft, upper and lower aerofoils of substantially equal chord, stabilizers at the trailing edges thereof, and an intermediate aerofoil the chord of which is approximately equal to the chords of the upper and lower aerofoils exclusive of said stabilizers.

4. In an aircraft, upper and lower aerofoils of substantially equal chord, and an intermediate aerofoil the chord of which is approximately equal to the gap between it and the upper and lower aerofoils and proportionately less than the chords thereof.

5. In an aircraft, upper and lower aerofoils of substantially equal chord, and an intermediate aerofoil the chord of which is approximately equal to the gap between it and the upper and lower aerofoils and proportionately less than the chords thereof, and a power plant supported on said intermediate aerofoil.

In testimony whereof I have affixed my signature.

WALTER HENRY BARLING.